United States Patent [19]
Shinoda et al.

[11] 3,958,544
[45] May 25, 1976

[54] AIR-FUEL RATIO CONTROL DEVICE IN AN INTERNAL COMBUSTION ENGINE

[75] Inventors: Kazuo Shinoda, Toyota; Hiroshi Koide, Okazaki, both of Japan

[73] Assignee: Toyota Jidosha Kogyo Kabushiki Kaisha, Toyoto, Japan

[22] Filed: May 7, 1974

[21] Appl. No.: 467,817

[30] Foreign Application Priority Data
May 17, 1973 Japan.............................. 48-54128

[52] U.S. Cl........................ 123/119 DB; 123/124 R
[51] Int. Cl.² ....................................... F02B 33/00
[58] Field of Search ..... 123/119 D, 119 DB, 124 R; 60/276, 285

[56] References Cited
UNITED STATES PATENTS 2,126,071  8/1938  Weiertz et al. ............... 123/119 DB
3,683,625  8/1972  McCrink ............................. 60/276
3,738,341  6/1973  Loos ..................................... 60/285
3,759,232  9/1973  Wahl et al. ........................... 60/276
3,768,259  10/1973  Carnahan ............................ 60/285

*Primary Examiner*—Charles J. Myhre
*Assistant Examiner*—James D. Liles
*Attorney, Agent, or Firm*—Stevens, Davis, Miller & Mosher

[57] ABSTRACT

An air-fuel ratio control device for internal combustion engines including a passage having air for adjusting the air-fuel ratio and which flows into an intake manifold disposed downstream of the carburetor, and a control valve in the passage, the control valve having two operating mechanisms for controlling the open area of the valve, one of the operating mechanisms being controlled in response to the throttle valve opening and the other operating mechanism being controlled in response to the exhaust gas composition.

3 Claims, 7 Drawing Figures

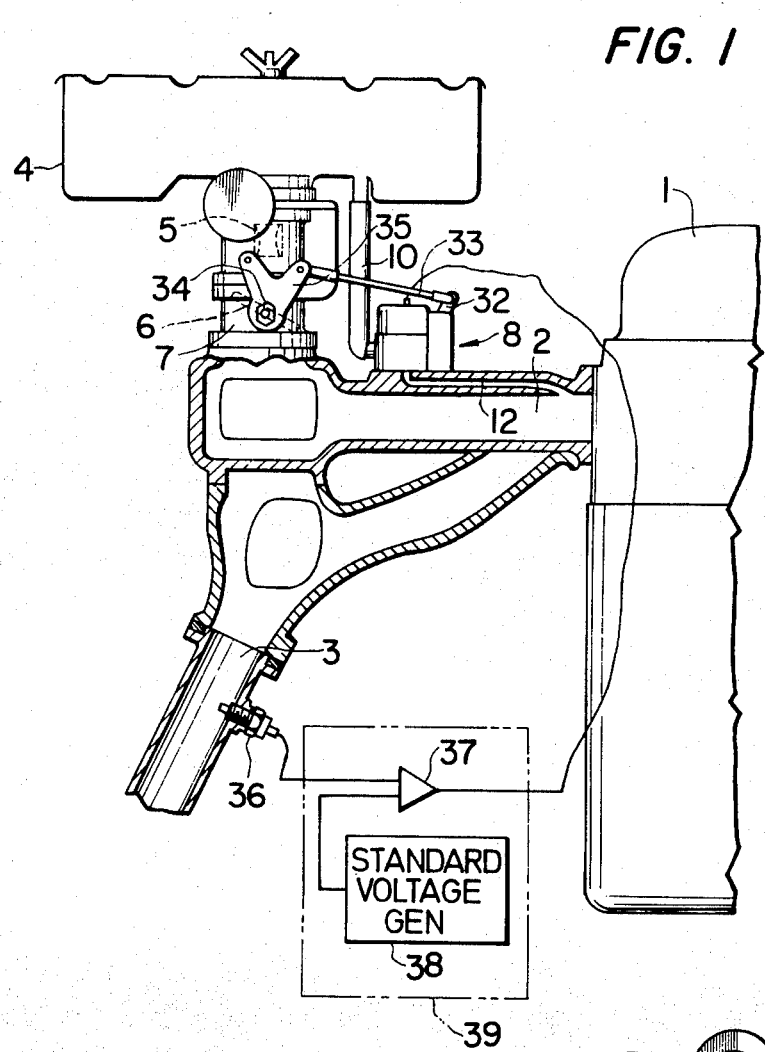
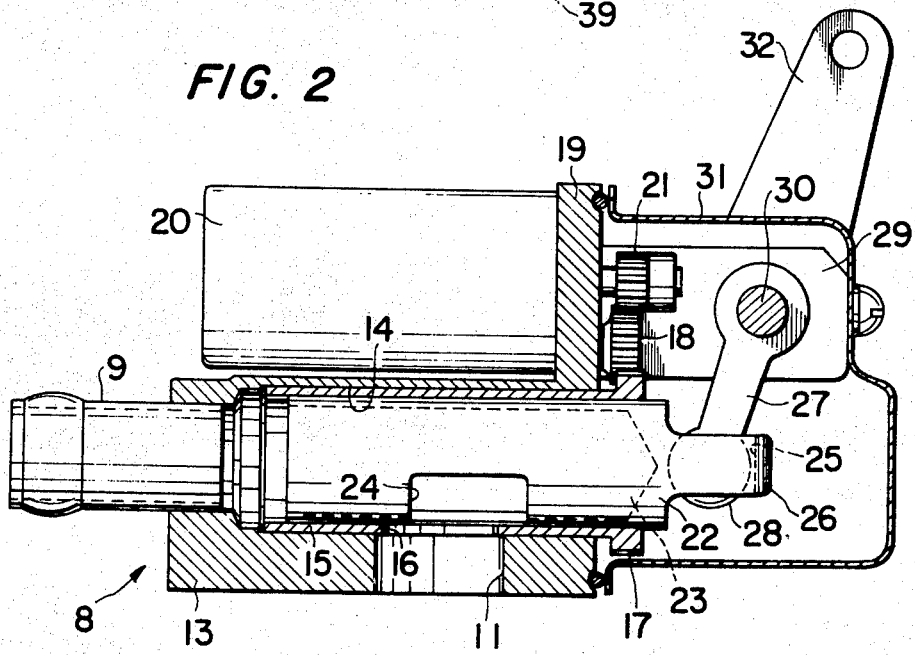

AIR-FUEL RATIO CONTROL DEVICE IN AN INTERNAL COMBUSTION ENGINE

BACKGROUND OF THE INVENTION

1. Field of the Invention

This invention relates to an air-fuel ratio control device for internal combustion engines whereby airflow is supplied into the fuel-air mixture fed into the engine from the carburetor so that the mixture will have precisely the theoretical air-fuel ratio to purify the exhaust gas.

2. Description of the Prior Art

Presently, catalytic converters are popularly used for purification of exhaust gas released from the internal combustion engines. Exhaust gas purifying efficiency of such catalytic converters, however, is greatly affected by the air-fuel ratio in the engine. For constantly maintaining high purifying efficiency of the catalytic converters, it is desirable that the air-fuel ratio characteristic of the carburetor be controlled with extremely high accuracy.

Generally, the carburetor used in an internal combustion engine is capable of feeding a fuel-air mixture having a substantially constant air-fuel ratio characteristic in all modes of engine operations. However, if examined minutely, such air-fuel ratio is found to vary within the range of about 20% according to engine speed and load condition, and hence a correct air-fuel mixture is not always supplied to the engine, thus often causing imperfect purification of exhaust gas.

SUMMARY OF THE INVENTION

The present invention has as an object an air-fuel ratio control device whereby the mixture fed into the engine may be adjusted to have the precisely constant air-fuel ratio. This is accomplished based on the fact that the oxygen or carbon monoxide concentration in the exhaust gas varies in response to the air-fuel ratio and that the amount of air varies in response to the opening of the throttle valve in the carburetor.

More specifically, the air-fuel ratio control device according to the present invention comprises a control valve adapted to control airflow therethrough into the intake manifold of the internal combustion engine, and two operating mechanisms for controlling the open area of the control valve, one of the operating mechanisms being mechanically connected to the throttle valve in the carburetor to operate in association therewith and the other operating mechanism being electrically connected to a control unit adapted to detect the exhaust gas composition and generate a signal for regulating the air-fuel ratio into the constant air-fuel ratio.

BRIEF DESCRIPTION OF THE DRAWINGS

FIG. 1 is a systematic diagram of an engine provided with an air-fuel ratio control device according to the present invention.

FIG. 2 is a front sectional view of a control valve.

DETAILED DESCRIPTION OF THE PREFERRED EMBODIMENTS

Figure 3:
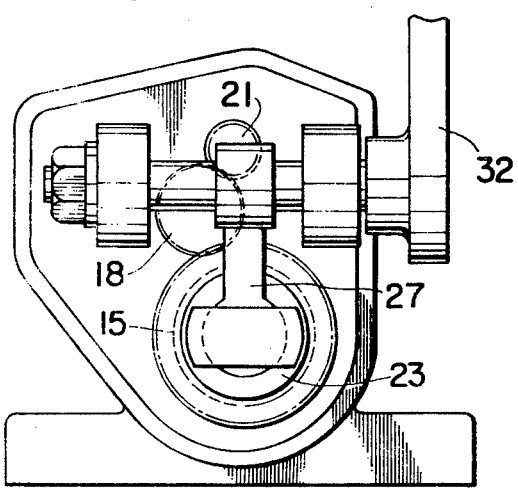
FIG. 3 is a fragmentary side elevation thereof.
Figure 4:
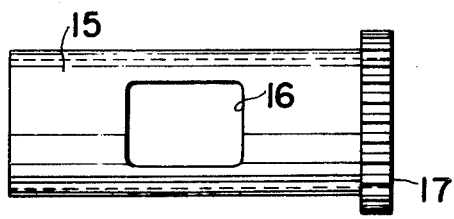
FIGS. 4 and 5 are plan views showing two different modifications of the control valve.
Figure 5:
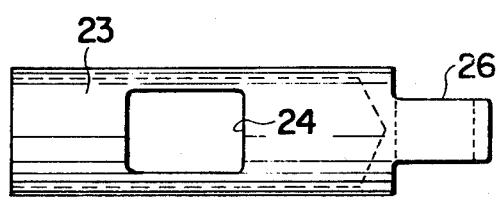

The embodiments of the present invention will now be described in detail with reference to FIGS. 1 to 6.

The engine 1 is provided with an intake manifold 2 and an exhaust manifold 3, the intake manifold 2 being designed to supply a fuel-air mixture through an air cleaner 4 and a carburetor 7 having a venturi 5 and throttle valve 6, while exhaust gas from the engine is released into the atmosphere through the exhaust manifold 3. The carburetor 7 is arranged such that the air-fuel ratio of the mixture will be maintained at for instance 14 : 1, slightly richer in fuel than the normal ratio of 15 : 1, over the entire range of engine operation. The intake manifold 2 is provided with a control valve 8 of which an inlet pipe 9 is connected to the air cleaner 4 through a conduit 10. A square discharge port 11 of the control valve 8 is connected to the intake manifold 2 through a passage 12 provided in the wall portion of the intake manifold 2, so as to supply air into the intake manifold 2. A cylindrical chamber 14 is formed in the valve body 13 of the control valve 8 and is connected to both the inlet pipe 9 and discharge port 11, and in which is provided a cylindrical control valve body 15 which is rotatably mounted. Substantially centrally of the control valve body 15 in its axial direction is formed an opening 16 of the same configuration as the discharge port 11 in the valve body 13. A gear 17 is provided around an end portion of the control valve body 15 which protrudes outwardly from the chamber 14. The gear 17 meshes with an idle gear wheel 18 which is rotatably mounted to a frame 19 provided integral with the valve body 13. The idle gear wheel 18 also meshes with a gear 21 driven by a servo-motor 20 mounted to the frame 19, so as to rotate the control valve body 15 when the servo-motor 20 is operated as will be described. This rotation of the control valve body 15 is performed so that the opening 16 will be in alignment with the discharge port 11 when the fuel-air mixture is richest and that the opening 16 will be completely out of alignment with the discharge port 11 when the mixture is leanest.

A cylindrical control valve body 23 is axially slidably connected in the inside of the control valve body 15 and is closed at the side of the gear 17 by a side wall 22. In the wall of the control valve body 23 opposed to the discharge port 11 of the control valve 8 is formed an opening 24 of the same configuration as the discharge port 11. The control valve body 15 is hermetically fitted with the chamber 14 and control valve body 23 and is arranged to be rotatable therebetween.

A frame member 26 is provided on the outside of the side wall 22 of the control valve body 23 and is formed with a hole 25 in which the spherical end portion 28 of a link 27 is engaged. The other end of the link 27 is secured to a shaft 30 rotatably connected to an arm 29 which is secured to the frame 19, thus allowing the control valve body 23 to slide with rotation of the shaft 30.

The mechanism for rotating the control valve body 15 and the sliding mechanism of the control valve body 23 are enclosed by the frame 19 and a cover 31 secured to the valve body 13. The shaft 30 extends out through the cover 31, and a lever 32 is secured to the protruding portion of the shaft 30. The lever 32 is pivotally secured at its other end to an end of a link 33, the other end of the link 33 being pivotally joined to a lever 35 secured to the rotating shaft 34 of the throttle valve 6. When the position of the throttle valve 6 changes, the shaft 34 is rotated, and the control valve body 23 slides through the link mechanism. This sliding motion of the control valve body 23 is so performed that the opening 24 will be brought into alignment with the discharge port 11 when the throttle valve 6 is fully opened, and that both openings 24 and 11 will be completely offset when the throttle valve is closed.

Figure 6:
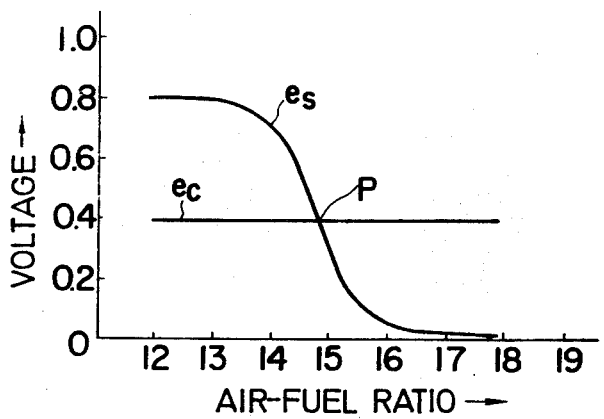
FIG. 6 is a graphic showing of sensor characteristics.

The exhaust manifold 3 is provided with a sensor 36 such as, for example, a zirconium oxide detector for detecting oxygen concentration in exhaust gas. An output signal from the sensor 36 is applied through a conductor to an amplifier 39 consisting of a differential amplifier 37 and a standard electric voltage generator 38. A signal for controlling the fuel-air mixture is applied from the amplifier 39 to the servo-motor 20 through a conductor. That is, a voltage $e_s$ generated by the sensor 36 and a constant voltage $e_c$ representative of a desired level of air-fuel ratio generated by the standard voltage generator 38 are supplied to the differential amplifier 37. As shown in FIG. 6, voltage $e_s$ varies greatly near the theoretical air-fuel ratio, and on the left side of the crossing point P of $e_s$ and $e_c$ in the figure, that is, when the mixture is rich, $e_s$ becomes greater than $e_c$. Hence, output signal $e_o$ from the differential amplifier 37 becomes positive to rotate the servo-motor 20 forwardly, while when the mixture is lean, a contrary operation takes place to reverse the rotation of the servo-motor 20.

Thus, according to the present invention, the output signal from the sensor 36 is always proportional to the air-fuel ratio of the mixture, and when such signal indicates that the mixture is rich, the amplifier 39 issues a positive signal to let the servo-motor 20 rotate forwardly, allowing the control valve body 15 also to rotate forwardly through the gear wheel 21, idle gear wheel 18 and gear 17, with the result that the area of the opening 16 in alignment with the discharge port 11 is enlarged to increase the amount of airflow therethrough. In this case, the control valve body 23 is allowed to move axially to the position corresponding to the degree of opening of the throttle valve 6, but if the throttle valve 6 is further opened to turn the lever 35 clockwise, the control valve body 23 is urged to slide left-wise through link 33, lever 32 and link 27 to enlarge that portion of the opening 24 which is in alignment with the discharge port 11. Thus, even if the air-fuel ratio is constant, the amount of air required for producing the theoretical air-fuel ratio in the mixture is varied depending on the opening of the throttle valve 6, that is, there is required an amount of air proportional to the amount of mixture supplied from the carburetor. In this way, the area of that portion of the opening 24 of the control valve body 23 which is in alignment with the discharge port 11 is controlled in response to the opening of the throttle valve 6. When the air-fuel ratio of the mixture is lowered in fuel or when the opening of the throttle valve 6 decreases, the above operation is reversed so that the amount of air supplied from the control valve 8 into the intake manifold 2 becomes proportional to the product of the circumferential distance and the axial distance of the control valve body.

Figure 7:
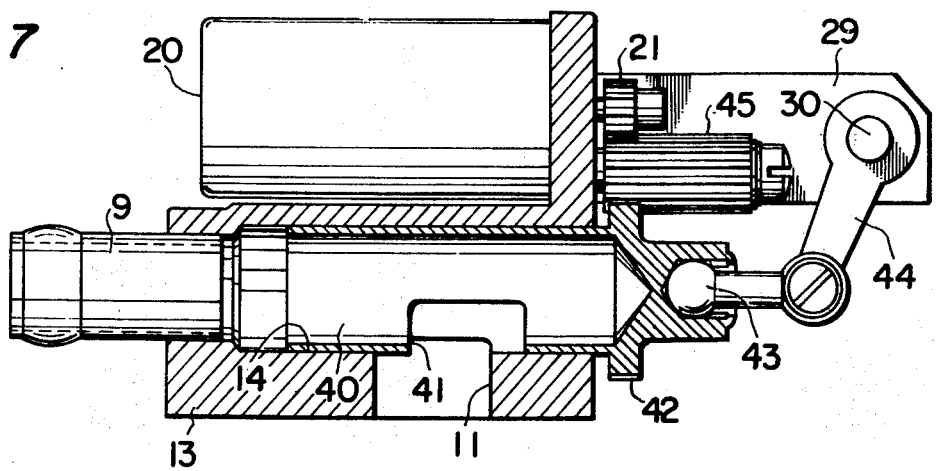
FIG. 7 is a front sectional view of a different form of control valve also embodying the present invention.

With reference now to FIG. 7, there is shown a control valve mechanism according to another embodiment of the present invention. In this embodiment, a cylindrical control valve body 40 is rotatably and slidably provided in the chamber 14 of the valve body 13. An opening 41 is provided substantially centrally of the control valve body 40 and is of the same configuration as the discharge port 11 of the valve body 13. The side of the control valve body 40 opposite from the inlet pipe 9 is closed and a gear 42 is provided thereiaround. There is also provided a ball joint 43 at the axial end of the control valve body 40, the ball joint 43 being pivotally connected at its other end to an end of a link 44, the other end of the link 44 being secured to a shaft 30 rotatably mounted to an arm 29. The gear 42 meshes with an idle gear wheel 45 which is elongated axially to allow meshing through the range of axial movement of the control valve body 40. The idle gear wheel 45 also meshes with the gear wheel 21 of the servo-motor 20.

In the operation of this control valve, when the servo-motor 20 is driven, the control valve body 40 is accordingly rotated through the gear wheel 21, idle gear wheel 45 and gear 42 and is also forced to slide axially through link 44 and ball joint 43 with rotation of the shaft 30. Hence, the amount of air supplied into the intake manifold 2 becomes proportional to the area of that portion of the opening 41 which is in alignment with the discharge port 11, that is, to the product of the circumferential distance and the axial distance.

Although the control mechanism of the control valve is shown as a combination of a link mechanism and a mechanism using the servo-motor, it is also possible to construct such control mechanism from a link mechanism alone.

According to the present invention, as described above, the air-fuel ratio in the mixture may be determined by detecting the exhaust gas composition, and an amount of air corresponding to the difference between the detected air-fuel ratio and the required value is provided, whereby the amount of air supplied is made proportional to the amount of mixture passing the throttle valve and thus the mixture supplied into the engine is controlled precisely to provide the constant air-fuel ratio. Therefore, when purifying exhaust gas by the use of a catalyst, extremely high purification performance and minimum deterioration of the catalyst are realized. Also, as the air-fuel ratio is controlled through adjustment with dilute air, a quicker response is obtained than in a system where the carburetor is controlled.

What we claim is:

1. An air fuel ratio control device in an internal combustion engine including an intake manifold, an exhaust manifold, a carburetor having a throttle valve and providing a fuel-air mixture, an oxygen sensor provided in the exhaust manifold and producing a first output signal corresponding to the concentration of oxygen in the exhaust manifold, a signal source for producing a second output signal representative of a desired air-fuel ratio, and means, responsive to the first output signal and second output signal, for generating a signal corresponding to the difference between the first output signal and second output signal, comprising:

a passage for supplying additional air into the intake manifold for diluting the fuel-air mixture provided by the carburetor; and a control valve, having a rectangular opening variable in area, for controlling the supply of the additional air in said passage, and including two operating means, provided in said control valve, for varying the opening of said valve, one of said operating means being linked to the throttle valve to vary one dimension of the opening of said valve in dependence on the opening of the throttle valve and the other operating means varying another dimension of the opening of said valve in dependence on the difference signal provided by the generating means, and in which said two operating means include means which act to vary the product of the length and width of the opening.

2. The air-fuel ratio control device as claimed in claim 1, wherein said control valve comprises a housing, said other operating means comprises a first valve member rotatably fitted in the housing of said valve to partly close the opening and a servomotor coupled to said first valve member and driven in dependence on the difference signal provided by the generating means, and said one operating means comprises a second valve member axially slidably fitted in said first valve member to partly close the opening.

3. The air-fuel ratio control device as claimed in claim 1, wherein said control valve comprises a housing, and said two operating means comprise in common a single valve member rotatably and axially slidably fitted in the housing of said valve to partly close the opening in both the rotational and axial direction of said single valve member.

* * * * *